United States Patent
Reavely et al.

[11] Patent Number: 4,988,469
[45] Date of Patent: Jan. 29, 1991

[54] METHOD OF FABRICATING FIBER REINFORCED COMPOSITE ARTICLES BY RESIN TRANSFER MOLDING

[75] Inventors: Richard T. Reavely, Madison; Wonsub Kim, Orange, both of Conn.

[73] Assignee: United Technologies Corporation, Hartford, Conn.

[21] Appl. No.: 483,970

[22] Filed: Feb. 16, 1990

Related U.S. Application Data

[63] Continuation of Ser. No. 274,099, Nov. 21, 1988, abandoned.

[51] Int. Cl.⁵ .................. B29C 43/18; B29C 43/20; B29C 45/02
[52] U.S. Cl. ..................... 264/113; 264/518; 264/258; 264/324; 264/325; 264/237; 264/348
[58] Field of Search ............. 264/257, 258, 122, 112, 264/113, 518, 324, 325, 237, 348; 156/497, 499, 228, 283, 285, 297, 299, 306.6, 313

[56] References Cited

U.S. PATENT DOCUMENTS

| | | | |
|---|---|---|---|
| 2,476,283 | 7/1949 | Castellan | 156/283 |
| 3,137,750 | 6/1964 | Gringras | 264/257 |
| 3,589,956 | 6/1971 | Kranz | 264/271 |
| 3,684,639 | 8/1972 | Keberle | 156/283 |
| 3,788,923 | 1/1974 | Solimar | 264/258 |
| 3,865,661 | 2/1975 | Hata | 156/283 |
| 4,195,112 | 3/1980 | Sheard | 264/122 |
| 4,470,862 | 9/1984 | More | 156/245 |
| 4,568,581 | 2/1986 | Peoples | 264/258 |
| 4,609,519 | 9/1986 | Pichard et al. | 264/510 |
| 4,663,225 | 5/1987 | Farley | 264/257 |
| 4,741,873 | 5/1988 | Fischer et al. | 264/25 |

Primary Examiner—Jay H. Woo
Assistant Examiner—Jeremiah F. Durkin, II

[57] ABSTRACT

A method of making fiber reinforced composite articles from stabilized dry fiber preforms which are impregnated with a thermosetting resin by the resin transfer molding method. The dry fiber preforms may be stabilized prior to molding by dispersing a polymeric binder between adjacent dry fabric plies of the preform. Hot air is passed through the preform after it has been compressed to fuse the binder and bind the dry fabric plies together, forming a stabilized high density fiber preform. Forming a preform by this method is significantly less labor and time intensive than methods currently in use.

8 Claims, 1 Drawing Sheet

METHOD OF FABRICATING FIBER REINFORCED COMPOSITE ARTICLES BY RESIN TRANSFER MOLDING

This is a continuation of Ser. No. 07/274,099 which was filed Nov. 21, 1988, now abandoned.

TECHNICAL FIELD

This invention relates generally to methods for resin transfer molding composite articles.

BACKGROUND ART

Resin transfer molding (RTM) is a process used to fabricate fiber reinforced composite articles. The process involves two basic procedures, fabricating a fiber preform in the shape of the finished article and impregnating the preform with a thermosetting resin. The resulting fiber reinforced composite article displays high strength and low weight. Such articles are commonly used in the aerospace industry and for other applications which require low weight, high strength materials.

The first procedure in the RTM process is to fabricate a fiber preform in the shape of the desired article. The preform generally comprises a plurality of fabric plies which will impart the desired reinforcing properties to the finished article. For example, the fabric plies may comprise graphite or KEVLAR TM fibers. Several steps are necessary to fabricate the preform. The exact steps which are required and the optimum order for performing the steps will vary depending on the shape of the preform. Any series of steps performed in any logical order which will produce the desired preform are satisfactory. Generally, the techniques used to form the preform are borrowed from the garment industry. For example, the fabric plies may be cut according to a predetermined pattern, laid up on a mandrel having the desired shape, and loosely bonded or stabilized so that the plies maintain the desired shape after being removed from the mandrel.

Once the fiber preform has been fabricated, it is placed into a transfer mold for the second procedure in the RTM process. The mold is closed and a resin, typically an epoxy such as a TACTIX 123/H41 (TM) resin (Dow Chemicals, Midland, Mich.) is injected under pressure to wet the preform. The resin initially has a viscosity about that of water to enable it to thoroughly impregnate the preform. The temperature of the mold is then increased, causing the resin to increase in viscosity and ultimately, to solidify. A finished fiber reinforced composite article typically comprises between approximately 50 vol % and approximately 60 vol % fibers. Typically high performance aerospace composite articles comprise between approximately 55 vol. % and 60 vol. % fibers.

One of the key steps in the RTM process is stabilizing the preform prior to placing it in the mold. Stabilization is necessary to ensure that the fabric plies maintain the desired shape and orientation until they are impregnated with resin. Stabilization also prevents the fabric plies from unraveling along cut edges. A considerable amount of developmental effort has been expended to optimize the stabilization step. The most common methods used to stabilize the preform are stitching and hot iron tacking. Both of these methods are labor and time intensive.

Stitching can be a very effective means of stabilizing the preform, however, stitching is difficult to perform after the fabric plies have been laid up on a mandrel. Moreover, stitching can make it difficult to fabricate a preform into a complex shape because stitching tends to make the fabric plies too rigid to bend easily. Therefore, stitching may not be an appropriate method of stabilizing a preform which has a complex shape.

Tacking is more conducive to fabricating preforms which have a complex shape. However, it may be more labor intensive and time consuming than stitching if the preform has many fabric plies. A thermoplastic polymer is disposed between each of the fabric plies and is melted with a hot iron. The polymer is allowed to refreeze to bond the plies together. Tacking must be done one ply at a time because heat transfer is by conduction only. Tacking one ply at a time is a relatively slow process because most of the reinforcing fabrics are poor heat conductors. Such a technique is taught by commonly owned U.S. Pat. No. 4,470,862 to More et al.

Accordingly, there has been a continuous effort in this field of art to develop a less labor and time intensive method of stabilizing RTM preforms.

DISCLOSURE OF INVENTION

The present invention is directed towards solving the problem of stabilizing RTM preforms with a minimum amount of labor and time.

The invention is a method of fabricating a fiber reinforced composite article by the resin transfer molding process. The method includes stacking a plurality of dry fabric plies, shaping the plies into a desired shape, and stabilizing the plies to form a dry fiber preform. The stabilized dry fiber preform is then placed into a resin transfer molding means. A thermosetting resin is injected into the resin transfer molding means under pressure to impregnate the stabilized fiber preform. The molding means is then heated to cure the thermosetting resin and form the fiber reinforced article. The improvement comprises disposing a polymeric binder between adjacent fabric plies and melting the binder by directing a stream of heated air through all of the fabric plies to bind the fabric plies together and forming a stabilized dry fiber preform.

The foregoing and other features and advantages of the present invention will become more apparent from the following description and accompanying drawings.

BEST MODE FOR CARRYING OUT THE INVENTION

Figure 4:
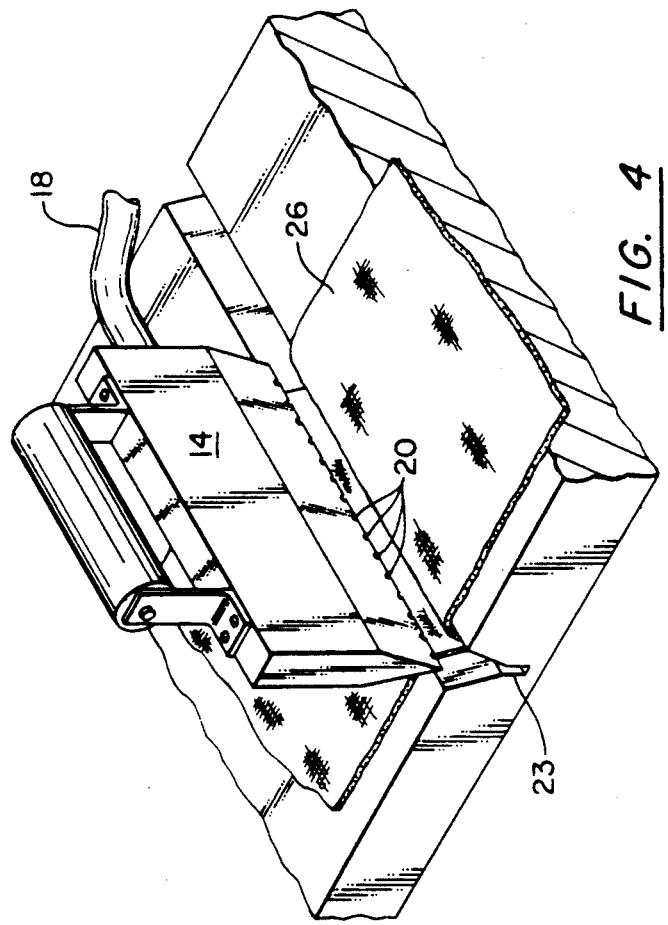
FIG. 4 illustrates the creasing of a fiber preform using the tool depicted in FIG. 3.

A preform used in the RTM process comprises a plurality of fabric plies which are loosely bonded together. The fabric used to form the preform comprises fibers which will impart the desired reinforcing properties to the finished article. For example, if the finished article is to have a high strength to weight ratio, the reinforcing fabric may comprise graphite fibers, KEV- LAR TM polyaramid fibers (E. I. DuPont DeNemours, Wilmington, Del.) or glass fibers. Depending on the amount of reinforcement desired, the preform typically comprises about 2 to about 12 plies. However, even up to 50 plies may be stabilized satisfactorily with this process depending on the density of the fabric weave.

The fabric plies are loosely bonded together or stabilized with a polymeric binder which is disposed between adjacent fabric plies. The polymeric binder may be any such polymer that is, when present in the amounts described hereafter, compatible with the thermosetting resin to be used later in the RTM process. The polymer binder may be a thermoplastic or thermoset. Selection of the binder depends on compatibility of the binder with the main matrix to be injected later, operational effectiveness, process environment control, and the final product performance etc. Although thermoset materials can be used as a preform binder material thermoplastics are preferred simply because of their operational convenience. Among the preferred thermoplastic polymers for use with this invention are nylon, polyetheretherketone (PEEK), and polyphenylene sulfide (PPS). The most preferred thermoplastic polymer for general use is nylon because of its relatively low melting point. The polymeric binder may be in the form of either small granules or thin fibers. Small granules are preferred because they allow the amount of thermoplastic binder used to stabilize the preform to be controlled more easily than if thin fibers are used. Typical particle sizes are about 100 to about 400 microns in diameter. The preferred method of disposing the polymer between the fabric plies is to use a fabric which has the polymer adhered to one of its faces. Facemate Corporation (Chicopee, Mass.) applies the granules to the desired fabric.

The amount of thermoplastic polymer used to stabilize the fabric plies must be small enough that the thermoplastic binder does not adversely affect the properties of the thermosetting resin to any appreciable degree. However, the amount of binder disposed between the fabric plies must be adequate to stabilize the preform. Preferably, the binder will make up a concentration of between approximately 5 g/m$^2$ to approximately 60 g/m$^2$ per each pair of adjacent fabric plies. Limiting the amount of binder to this range strikes a balance between the somewhat conflicting goals of stabilizing the preform while not adversely affecting the properties of the finished article to an appreciable degree. Most preferably, the binder will make up a concentration of between approximately 5 g/m$^2$ to approximately 20 g/m$^2$ of thermoplastic polymer disposed between each pair of adjacent fabric plies.

To form the preform, the fabric plies are laid one on top of the other such that a desired fiber orientation is achieved. The plies may be laid up on a flat surface or on a mandrel which conforms to the shape of the desired finished article. The fabric plies are cut according to a desired pattern to facilitate the layup. If the binder and fabric are not adhered together, a binder may be disposed between adjacent fabric plies during this layup step. Typically a felt or powder binder is used in the latter case.

Figure 1:
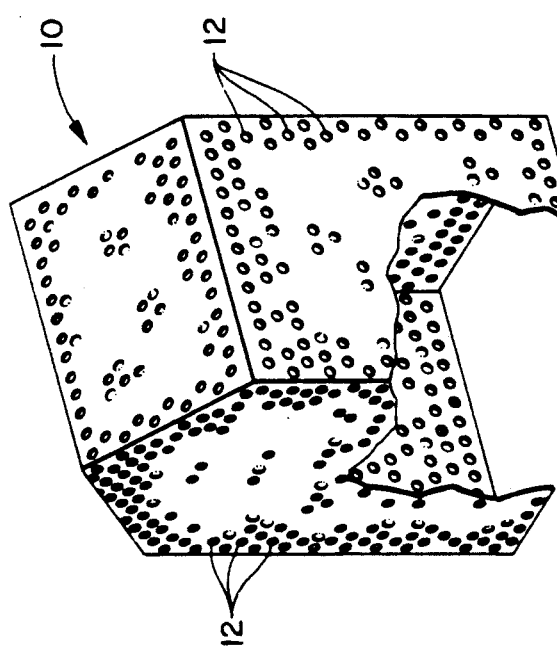
FIG. 1 shows a perforated mandrel which is used to shape the preform.

The forming surface, flat surface or mandrel on which the fabric plies are laid up is typically porous (e.g., holes or grid). Such a mandrel (10) is shown in FIG. 1. The holes (12) permit the hot air which is used to fuse the thermoplastic polymer to flow easily through the fabric plies. Typically, the area occupied by the pores is more than approximately 20% of the total area of the flat surface on mandrel. The forming surface used to lay up the fabric plies is fabricated from a material which can be formed into the desired shape and easily perforated with holes of the desired size. Alternatively the forming surface should be porous. Moreover, the forming surface must be capable of maintaining its shape and structure after being exposed to a stream of hot air. For example, the forming surface may be fabricated from aluminum or a similar lightweight metal or plastic. For some applications, only the surface of a forming tool needs to be porous. For example, if the melting temperature of the plastic binder is low, a mandrel may be covered with a layer of porous material, such as fabric or fibrous felt.

The forming tool may be equipped with vacuum capability. Vacuum pressure behind the surface perforations can serve three very important functions. First, in the fabric lay-up process, the vacuum can hold fabrics in place temporarily until hot air is applied for final preform stabilization. Second, the vacuum can be used to promote hot air penetration through the laminate. Thus, the hot air path is from the applicator through the preform laminate and through the forming surface perforations to the vacuum space. Third, subsequent to the application of hot air and melting of the binder vacuum pressure can be used to draw cool room air through the fabric to solidify the molten plastic binder rapidly. The rapid solidification of the plastic binder enhances the preform compaction and increases the production rate.

The forming tool may be equipped with the capability to blow cold air or chilled gas in the direction opposite to the hot air flow facilitating even higher preform compaction. When the plastic binder is melted sufficiently by the injection of hot air, the hot air supply may be stopped and cold air or a chilled gas may be blown from the perforations on the forming surface through the laminate. The pressure should be maintained during the cold air application. This process provides even higher preform density.

After the fabric plies are laid up on the perforated flat surface or mandrel, they are stabilized with pressurized hot air. The hot air fuses the binder disposed between the plies, causing them to bind together.

The temperature of the air is a function of the type of binder disposed between the fabric plies, the speed with which the polymer is to be melted, and the preform laminate thickness. For example, if nylon 12 is disposed between about 8 fabric plies, air at a temperature of approximately 220° F. to approximately 400° F. melts substantially all of the polymer in about 5 seconds. The air is supplied at a pressure sufficient to allow it to penetrate all of the fabric plies simultaneously. For example, if the preform comprises above about approximately 9 plies, an air pressure of between 5 psi to 10 psi is preferred. The air is directed through the fabric plies for a period of time long enough to permit the hot air to melt the polymer disposed between all of the fabric layers in contact with the tool. The time required to melt the polymer will depend on the number of plies in the preform, the polymer used, and the temperature of the air. Hot air may be directed through the fabric plies at various points in order to stabilize the entire preform or local spots.

Figure 3:
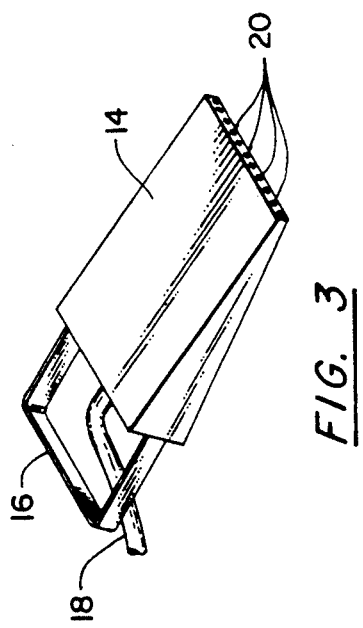
FIG. 3 shows another tool which can be used to blow hot air through the preform.
Figure 2:
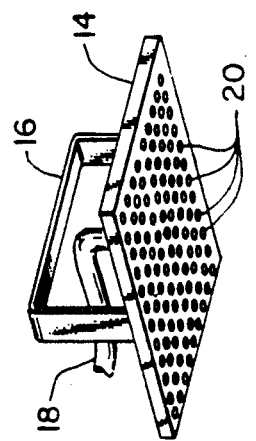
FIG. 2 shows a tool used to blow hot air through a preform in order to fuse the polymer disposed between the fabric plies to stabilize the preform.

A tool, such as the ones shown in FIGS. 2 and 3, may be used to direct the hot air through the fabric plies and to press the plies together at the same time. These tools have a body (14) which is fabricated from a rigid, low heat conductive material such as glass fiber reinforced resin or ceramic. The low heat conductive tool body prevents the heat contained in the air stream from being absorbed by the tool body. A handle (16) allows the operator to pick up and properly orient the tool. An air supply connection (18) connects the tool to an air supply hose. The tool body has many holes (20) which are used to direct the pressurized heated air through the fabric plies. A tool with a flat surface, such as the one shown in FIG. 2, may be used to stabilize large portions of the preform quickly. A tool with a narrow end, such as the one shown in FIG. 3, may be used to stabilize corners and creases in the preform. Although the stabilization tools are shown in these two particular configurations, any configuration which will permit hot air to be directed through fabric plies may be used. For example, a hot air gun may be used to tack binder containing plies together.

EXAMPLE

A graphite fiber reinforced composite article which has the shape of the mandrel depicted in FIG. 1 may be fabricated as follows. First, a dry fiber preform is formed. Four plies of graphite fiber fabric which have small granules of nylon dispersed on one face are cut according to predetermined patterns. The fabric plies are laid in sequence on a perforated flat surface, and a flat hot air injecting tool as shown in FIG. 2 is used to inject hot air through the fabric laminate. 300° F. air is injected for five seconds to tack the layers. Then a tool as shown in FIG. 3 is used to crease lines on the flat laminate that correspond to the corners on the mandrel shown in FIG. 1. FIG. 4 shows an example of creasing corner lines on a preform laminate 26. The "V" notch 23 in FIG. 4 is designed to accept various thicknesses of laminates. Finally, the tacked and creased fabric laminate is transferred to the forming mandrel shown in FIG. 1 and then the joining seams are tacked to complete the operation.

Using this hot air process to stabilize preforms for use in the RTM process significantly decreases the amount of labor and time required compared to current means. Decreasing the amount of labor and time required to stabilize RTM preforms will make RTM a more practical means of fabricating fiber reinforced composite articles. This is especially true for fiber reinforced articles which have a complex shape.

Although this invention has been shown and described with respect to detailed embodiments thereof, it will be understood by those skilled in the art that various changes in form and detail thereof may be made without departing from the spirit and scope of the claimed invention.

We claim:

1. In a method of fabricating a fiber reinforced composite article including stacking a plurality of dry fabric plies, shaping the plies into the desired shape, and stabilizing said plies to form a dry fiber preform, placing the stabilized dry fiber preform into a resin transfer molding means, injecting a thermosetting resin into the resin transfer molding means under pressure to impregnate said stabilized fiber preform with the thermosetting resin, and heating said stabilized fiber preform and thermosetting resin to cure the thermosetting resin and form the fiber reinforced article, the improvement in forming the dry fiber preform comprising:

stabilizing the plies by disposing about 5 grams to about 20 grams of polymeric binder per square meter fabric ply surface between each pair of adjacent dry fabric plies, laying up the fabric plies on a shaped perforated mandrel, applying compaction pressure against the fabric plies by a tool having a body fabricated from a low heat conductive material, wherein the tool is shaped to conform to the mandrel and, while applying said compaction pressure, first passing hot air at a temperature of approximately 250° F. to 400° F. through the tool at air pressure sufficient to penetrate all of the fabric plies and subsequently passing relatively cool air at room temperature or below through the tool at air pressure sufficient to penetrate the fabric plies, whereby the fabric plies form a high density stabilized dry fiber preform.

2. The method of claim 1 wherein the fabric plies are graphite fibers.

3. The method of claim 1 wherein the fabric plies are aramid fibers.

4. The method of claim 1 wherein the fabric plies are glass fibers.

5. The method of claim 1 wherein the binder is dispersed between adjacent fabric plies in the form of a powder beads or fiber felt.

6. The method of claim 1 wherein the polymeric binder is a thermoplastic polymer of nylon.

7. The method of claim 1 wherein the polymeric binder is a thermoplastic polymer of polyetheretherketone.

8. The method of claim 1 wherein said cool air is at a chilled temperature below room temperature.

* * * * *